(12) United States Patent
Kim et al.

(10) Patent No.: US 11,511,792 B2
(45) Date of Patent: Nov. 29, 2022

(54) ELECTRIC DRIVE CONTROL DEVICE

(71) Applicant: MANDO CORPORATION, Gyeonggi-do (KR)

(72) Inventors: Ji Hwan Kim, Gyeonggi-do (KR); Su-Min Lee, Gyeonggi-do (KR); Jong Mu Lee, Gyeonggi-do (KR); Kyu Yeong Je, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 788 days.

(21) Appl. No.: 16/409,738

(22) Filed: May 10, 2019

(65) Prior Publication Data

US 2019/0351935 A1 Nov. 21, 2019

(30) Foreign Application Priority Data

May 15, 2018 (KR) .................. 10-2018-0055480

(51) Int. Cl.
*B62D 5/04* (2006.01)
*B60K 1/04* (2019.01)
*H02K 11/33* (2016.01)

(52) U.S. Cl.
CPC ............. *B62D 5/0406* (2013.01); *B60K 1/04* (2013.01); *B62D 5/046* (2013.01); *H02K 11/33* (2016.01); *B60K 2001/0405* (2013.01)

(58) Field of Classification Search
CPC .................. B62D 5/046; B62D 5/0406; B60K 2001/0405; H02K 11/33
See application file for complete search history.

(56) References Cited

U.S. PATENT DOCUMENTS

| | | | | |
|---|---|---|---|---|
| 11,052,841 B2* | 7/2021 | Fujimoto | ............... | H02K 11/33 |
| 2011/0285223 A1* | 11/2011 | Miyachi | ................ | H02K 11/33 |
| | | | | 310/68 D |
| 2013/0257232 A1* | 10/2013 | Tomizawa | ............. | H02K 29/08 |
| | | | | 310/68 R |
| 2013/0301220 A1* | 11/2013 | Hotta | ................. | H05K 7/20927 |
| | | | | 361/699 |
| 2016/0352190 A1* | 12/2016 | Hieda | .................. | H02K 11/215 |
| 2017/0358973 A1* | 12/2017 | Jugovic | .................. | H02K 11/05 |
| 2018/0103559 A1* | 4/2018 | Park | ....................... | H02K 9/227 |
| 2018/0219449 A1* | 8/2018 | Yamamoto | .............. | H02K 9/22 |
| 2018/0226861 A1* | 8/2018 | Palmer | .................. | H02K 11/33 |
| 2019/0199175 A1* | 6/2019 | Kanazawa | ............. | B62D 5/046 |

* cited by examiner

*Primary Examiner* — Tony H Winner
(74) *Attorney, Agent, or Firm* — Ladas & Parry, LLP

(57) ABSTRACT

According to an embodiment of the present invention, an electric drive control device of the present invention, which is for controlling an electric motor that generates a drive force, includes a first electronic control unit disposed on a side opposite to a drive shaft of the electric motor among both sides of a motor housing in which the electric motor is accommodated in a direction of the drive shaft and configured to control the electric motor, and a second electronic control unit disposed opposite to the first electronic control unit in the direction of the drive shaft and configured to control the electric motor.

9 Claims, 5 Drawing Sheets

ELECTRIC DRIVE CONTROL DEVICE

CROSS-REFERENCE TO RELATED APPLICATION

This application claims priority to and the benefit of Korean Patent Application No. 10-2018-0055480, filed on May 15, 2018, the disclosure of which is incorporated herein by reference in its entirety.

BACKGROUND

1. Field of the Invention

The present invention relates to an electric drive control device, and more particularly, to an electric drive control device for controlling an electric motor that generates a drive force.

2. Discussion of Related Art

A packaging technique in which an electronic control unit (ECU), which controls a rotational speed and a rotation torque of an electric motor, is integrally formed with an electric motor is being employed in electric power steering (EPS) systems of vehicles, etc. In this regard, in order to overcome a limitation of a mounting space in a vehicle, there is a need to improve efficiency of arrangement in a package and to reduce the size of a package.

In particular, in the trend of reinforcement in safety regulations (ISO 26262) related to fail/safety as the number of electric systems for vehicles increases, redundancy design is being used as a countermeasure. However, since two ECUs should be mounted in a package in order to reflect the redundancy design, there is a further increasing need to improve efficiency of arrangement in a package and to reduce the size of a package.

Meanwhile, in the redundancy design described above, identical ECUs are designed to be redundant. Since the two ECUs perform mutual monitoring and operate independently, each of the ECUs should have a unique identification (ID). However, the two ECUs designed with redundancy design generally have the same hardware (H/W) structure. When unique IDs are given to each of the ECUs having the same appearance using a software (S/W) method such as a boundary scan and then an assembly process is performed, it is difficult to distinguish between the two ECUs, and as a result, mixing therebetween may occur, which may cause an assembly failure. In addition, there is a problem in that, when the IDs of two ECUs are identified using a pull-up resistor and pull-down resistor in hardware, the IDs should be separately managed in a mass-production line.

SUMMARY OF THE INVENTION

The present invention is directed to providing an electric drive control device in which efficiency of arrangement in a package is improved and the size of the package is reduced by forming an electronic control unit integrally with an electric motor.

The present invention is also directed to providing an electric drive control device in which heat dissipation of an electronic control unit disposed along a drive shaft of an electric motor is effectively performed.

The present invention is also directed to providing an electric drive control device that is efficient in production and management.

According to an aspect of the present invention, there is provided an electric drive control device, which is for controlling an electric motor that generates a drive force, including a first electronic control unit disposed on a side opposite to a drive shaft of the electric motor among both sides of a motor housing in which the electric motor is accommodated in a direction of the drive shaft and configured to control the electric motor, and a second electronic control unit disposed opposite to the first electronic control unit in the direction of the drive shaft and configured to control the electric motor.

In this case, the electric drive control device may further include a heat dissipating member disposed on the side opposite to the drive shaft of the electric motor among both sides of the motor housing in the direction of the drive shaft and configured to dissipate heat generated in the first electronic control unit and the second electronic control unit.

The heat dissipating member may include an annular first heat dissipating member disposed in contact with an end opposite to the drive shaft of the electric motor among ends of both sides of the motor housing, and a plate-shaped second heat dissipating member disposed between the first electronic control unit and the second electronic control unit in the direction of the drive shaft and having one side connected to the first heat dissipating member.

The first heat dissipating member may be coupled to the end opposite to the drive shaft of the electric motor among the ends of both sides of the motor housing.

The first electronic control unit and the second electronic control unit may each include a power circuit unit associated with electric power supplied to the electric motor, and the second heat dissipating member may include protrusions protruding such that the power circuit units of the first electronic control unit and the second electronic control unit are in contact with one side surface and the other side surface thereof, which are in contact with the first electronic control unit and the second electronic control unit.

The protrusions may have a shape in which at least one portions thereof do not overlap each other when viewed in a vertical direction.

Each of the first electronic control unit and the second electronic control unit may be implemented on one circuit board.

The electric drive control device may further include a connection board disposed on the end opposite to the drive shaft of the electric motor among the ends of both sides of the motor housing and configured to connect the first electronic control unit and the second electronic control unit to the electric motor.

The connection board may include a first connection terminal and a second connection terminal connected to any one of the first electronic control unit and the second electronic control unit, and the first connection terminal and the second connection terminal may each have a unique identification (ID) assigned separately in hardware.

The first electronic control unit and the second electronic control unit may be identified by the unique IDs of the first connection terminal and the second connection terminal, respectively.

The connection board may include a motor position sensor.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
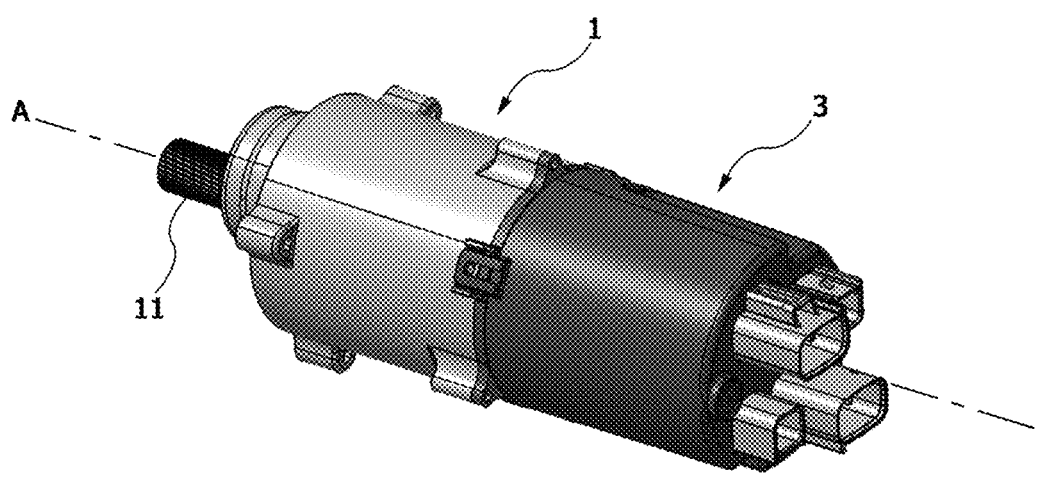
FIG. 1 is a perspective view of an electric drive package including an electric drive control device according to an embodiment of the present invention.

Hereinafter, embodiments of the present invention that can be easily performed by those skilled in the art will be described in detail with reference to the accompanying drawings. The present invention may be implemented in several different forms and is not limited to the embodiments described herein. Parts irrelevant to description are omitted in the drawings in order to clearly explain the present invention. The same or similar components are denoted by the same reference numerals throughout this specification.

It should be further understood that the terms "comprise," "comprising," "include," and/or "including," when used herein, specify the presence of stated features, integers, steps, operations, elements, parts, or combinations thereof, but do not preclude the presence or addition of one or more other features, integers, steps, operations, elements, parts, or combinations thereof.

Figure 2:
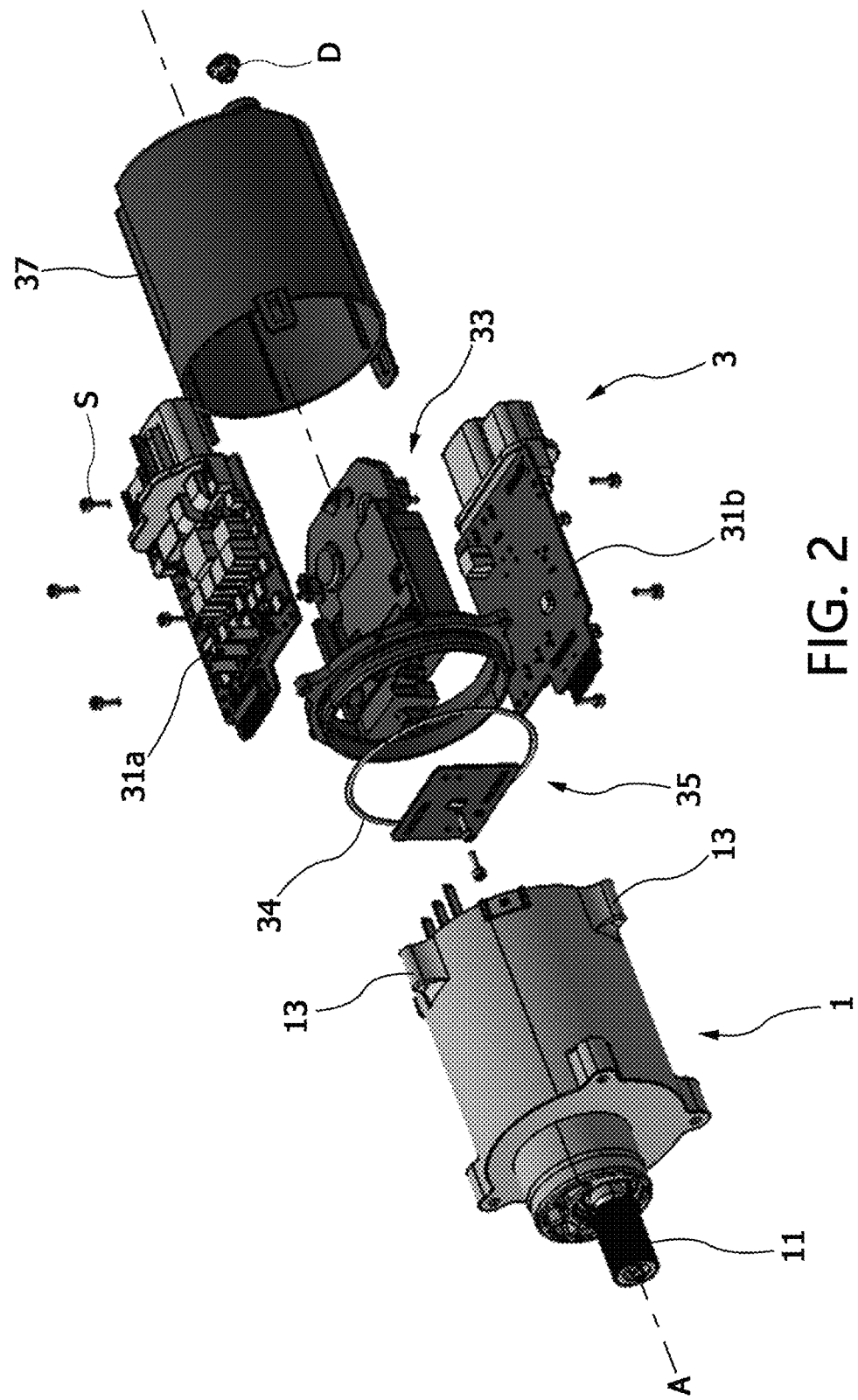
FIG. 2 is an exploded perspective view of FIG. 2.
Figure 3:
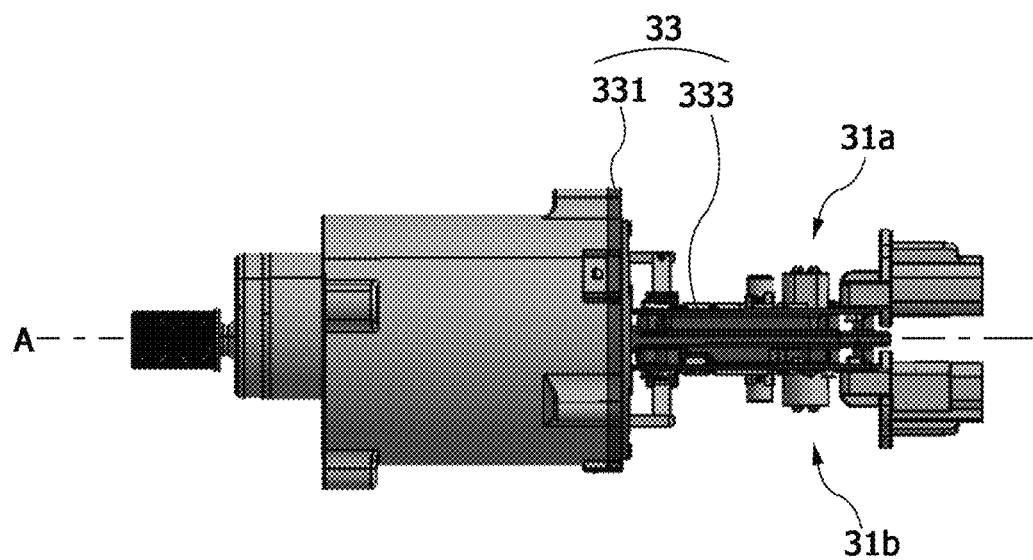
FIG. 3 is a side view of the electric drive control device in which a cover is removed in FIG. 1.

FIG. 1 is a perspective view of an electric drive package including an electric drive control device according to an embodiment of the present invention, FIG. 2 is an exploded perspective view of FIG. 2, and FIG. 3 is a side view in which a cover of the electric drive control device in FIG. 1 has been removed.

Referring to FIGS. 1 to 3, an electric drive control device 3 according to an embodiment of the present invention is a device for controlling an electric motor that generates a drive force, and is disposed on a side opposite to a drive shaft 11 of the electric motor among both sides of a motor housing 1 in which the electric motor is accommodated. The electric drive control device 3 may be disposed along an axis A extending along the drive shaft 11. Further, the electric drive control device 3 may include a first electronic control unit 31a, a second electronic control unit 31b, a heat dissipating member 33, a connection board 35, and a cover 37.

In this case, the electric motor in the motor housing 1 may be applied to an electric power steering (EPS) system of a vehicle. Specifically, the electric motor may serve to generate a steering angle detected from a steering wheel manipulation by a driver, and a steering assist force corresponding to a torque.

Figure 4:
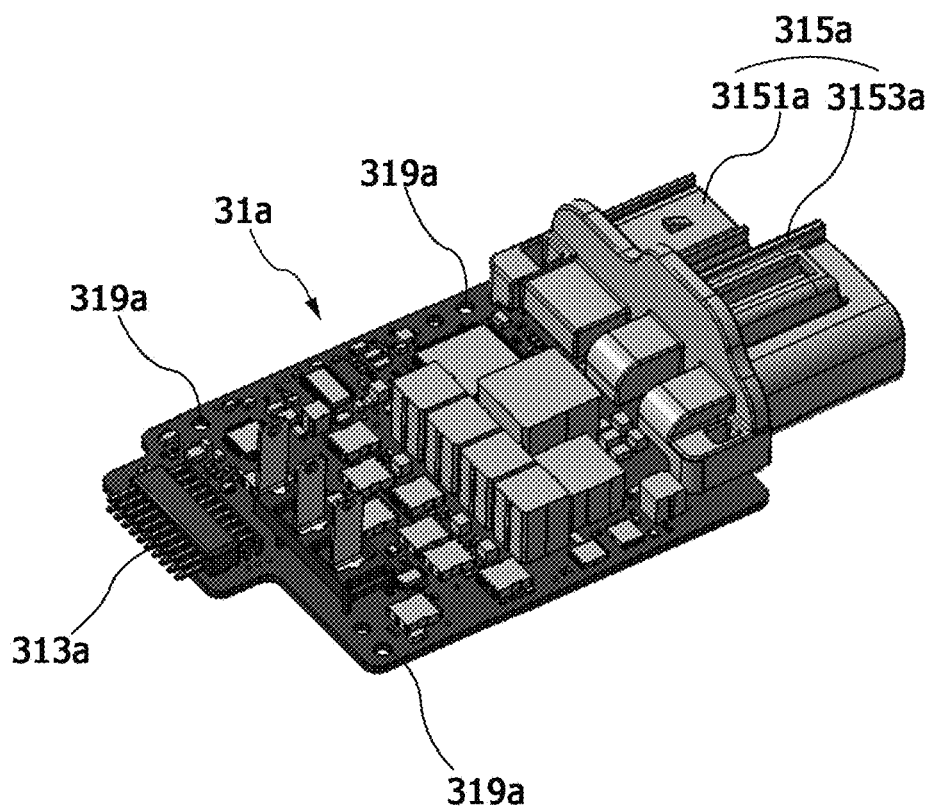
FIGS. 4 and 5 are a perspective view and a plan view of a first electronic control unit of the electric drive control device according to the embodiment of the present invention, respectively.
Figure 5:
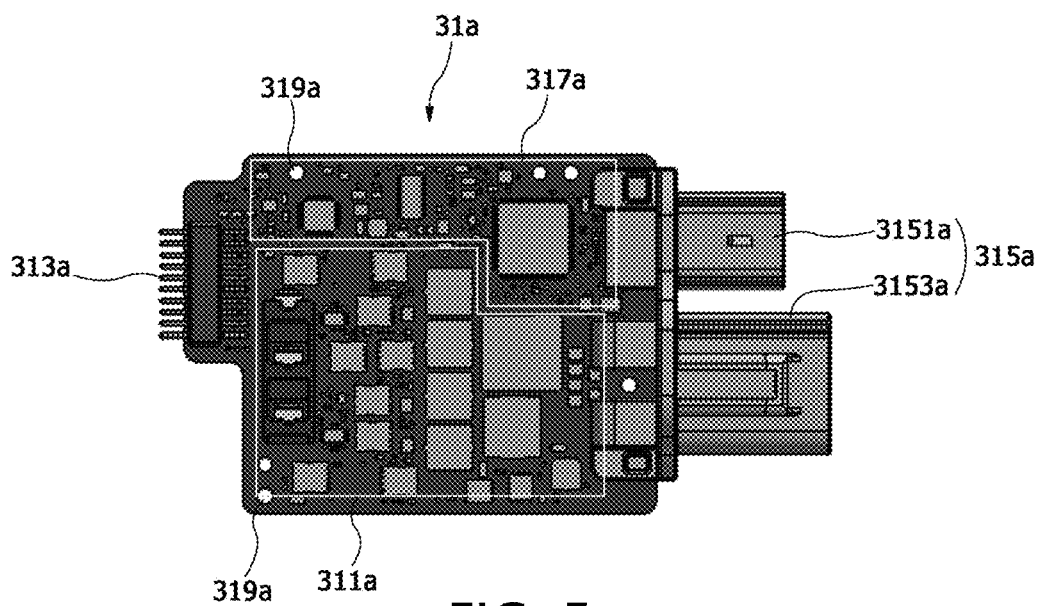

The first electronic control unit 31a is disposed on the side opposite to the drive shaft 11 among both sides of the motor housing 1 in a direction of the axis A, and controls the electric motor. Referring to FIGS. 4 and 5, the first electronic control unit 31a may include a power circuit unit 311a, a connecting pin unit 313a, a connector unit 315a, a control circuit unit 317a, and screw holes 319a. Further, the first electronic control unit 31a may be implemented on one circuit board. The circuit board may be a printed circuit board (PCB).

The power circuit unit 311a is a circuit associated with electric power supplied to the electric motor, and converts power supplied from the outside into power appropriate for driving the electric motor. The power circuit unit 311a is a main heat generating unit of the first electronic control unit 31a, and at least one portion thereof is disposed in contact with protrusions 3331 of a second heat dissipating member 333 for smooth heat dissipation, as will be described below.

The connecting pin unit 313a is an interface that allows the electric motor to be connected to the first electronic control unit 31a. Through the connecting pin unit 313a, power which is supplied from the power circuit unit 311a is supplied to the electric motor, and sensing information related to the electric motor is transmitted to the first electronic control unit 31a.

The connector unit 315a is an interface that allows the first electronic control unit 31a to be connected to an external power source (not shown) and an external device (not shown). The connector unit 315a may include a first connector 3151a for transmitting control information of the first electronic control unit 31a or sensing information related to the electric motor to the outside, and a second connector 3153a to which an external power source is connected.

The control circuit unit 317a is a portion for controlling the power circuit unit 311a, the connecting pin unit 313a, the connector unit 315a, and the like. The control circuit unit 317a has a relatively small heating value as compared with the power circuit unit 311a.

The screw hole 319a is a portion into which a screw S for coupling the first electronic control unit 31a to the heat dissipating member 33 is inserted. Of course, the coupling between the first electronic control unit 31a and the heat dissipating member 33 may be performed in various ways in addition to the method using the screw S. Accordingly, the screw hole 319a may not be provided.

The second electronic control unit 31b is a unit which is disposed opposite to the first electronic control unit 31a in the direction of the axis A to control the electric motor. The second electronic control unit 31b may have the same configuration as the first electronic control unit 31a, and an external appearance of the second electronic control unit 31b may be the same as that of the first electronic control unit 31a. Further, like the first electronic control unit 31a, the second electronic control unit 31b may be implemented on one circuit board and, more specifically, one PCB.

The second electronic control unit 31b may serve to control the electric motor together with the first electronic control unit 31a, may not operate during the operation of the first electronic control unit 31a as a redundant unit of the first electronic control unit 31a, and may control the electric motor only when the first electronic control unit 31a fails to control the electric motor due to a failure or the like.

Figure 6:
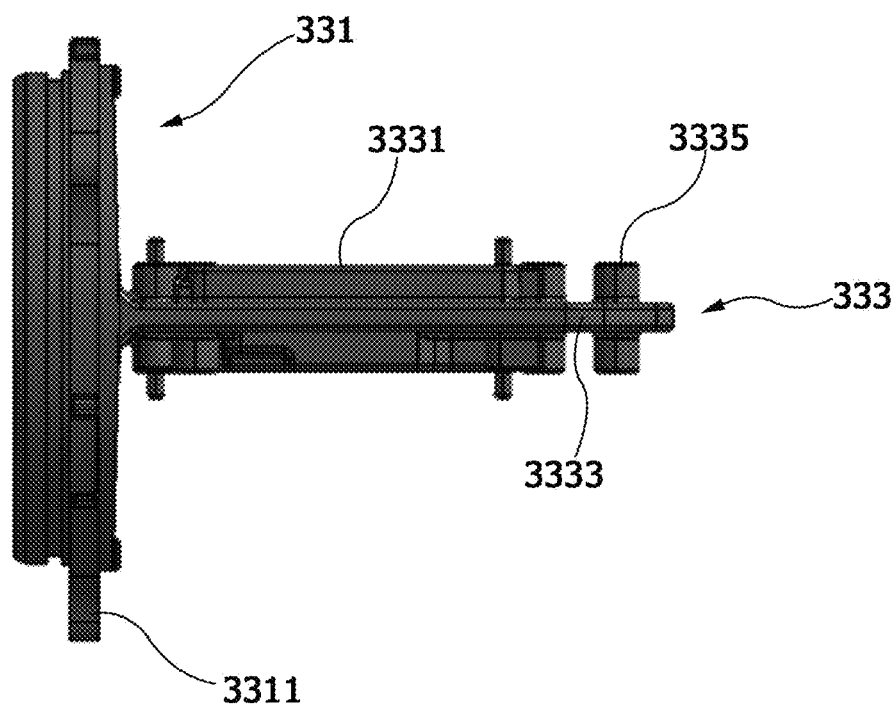
FIGS. 6 and 7 are a side view and a plan view of a heat dissipating member of the electric drive control device according to the embodiment of the present invention, respectively.
Figure 7:
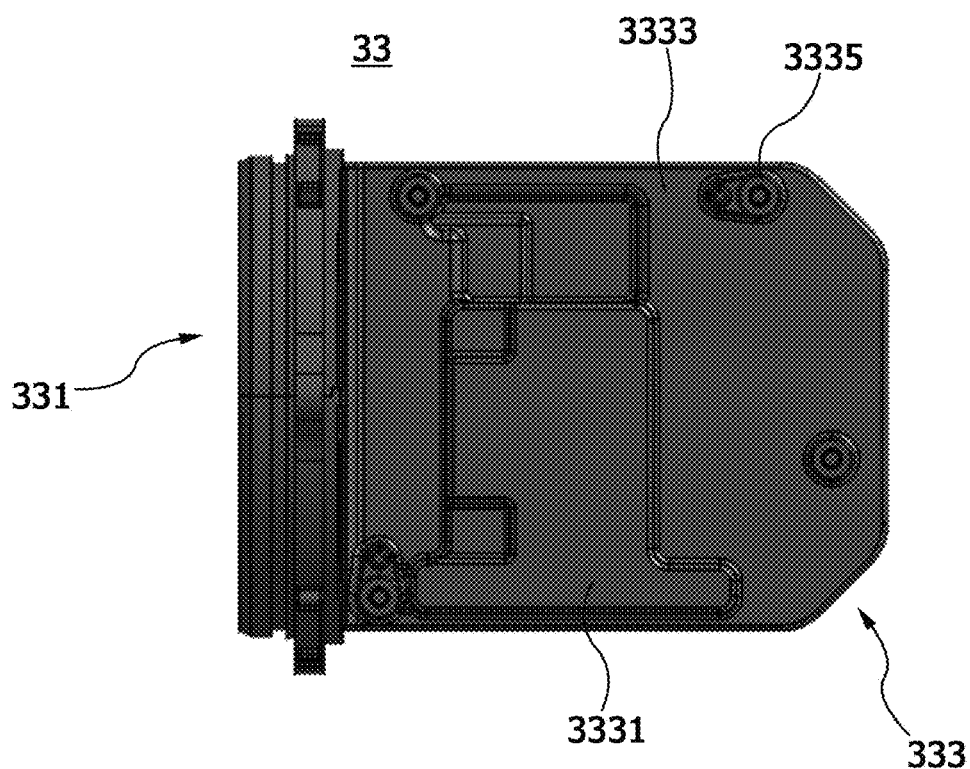

The heat dissipating member 33 is disposed on the side opposite to the drive shaft 11 of the electric motor among both sides of the motor housing 1 in the direction of the axis A, and dissipates heat generated in the first electronic control unit 31a and the second electronic control unit 31b. Referring to FIGS. 6 and 7, the heat dissipating member 33 may include a first heat dissipating member 331 and the second heat dissipating member 333.

The first heat dissipating member 331 is an annular member disposed in contact with an end opposite to the drive shaft 11 of the electric motor among ends of both sides of the motor housing 1. The first heat dissipating member 331 may be coupled to the end opposite to the drive shaft 11 of the electric motor among the ends of both sides the motor housing. The first heat dissipating member 331 may include a screw hole 3311 formed on an outer circumferential surface thereof in communication with the screw hole 319a protruding from the end of the motor housing 1, and fastening may be performed by the screw in a state in which the first heat dissipating member 331 is disposed on the end of the motor housing 1. Meanwhile, as shown in FIG. 2, an O-ring 34 may be disposed between the first heat dissipating member 331 and the motor housing 1 in order to secure airtightness for preventing penetration of moisture, foreign matter, and the like.

The second heat dissipating member 333 is a plate-shaped member which is disposed between the first electronic control unit 31a and the second electronic control unit 31b along the axis A and having one side connected to the first heat dissipating member 331. The heat generated in the first electronic control unit 31a and the second electronic control unit 31b is transmitted to the first heat dissipating member 331 through the second heat dissipating member 333 and emitted to the motor housing 1 or the outside. The second heat dissipating member 333 may include the protrusions 3331, non-protrusions 3333, and screw holes 3335.

The protrusions 3331 are portions protruding such that at least one portion of the power circuit unit 311a of the first electronic control unit 31a and at least one portion of a power circuit unit of the second electronic control unit 31b are in contact with one side surface and the other side surface of the second heat dissipating member 333, which are in contact with the first electronic control unit 31a and the second electronic control unit 31b, respectively. The protrusions 3331 allow a relatively large amount of heat in the power circuit unit 311a of the first electronic control unit 31a and the power circuit unit of the second electronic control unit 31b to be smoothly conducted through direct contact.

The protrusions 3331 which are formed on the one side surface and the other side surface of the second heat dissipating member 333 may be formed in an offset form instead of overlapping each other in a vertical direction. That is, in an embodiment of the present invention, the protrusions 3331 which are formed on the one side surface and the other side surface of the second heat dissipating member 333 have a shape in which at least one portions thereof do not overlap each other when viewed in the vertical direction. With such a structure, a heat dissipation area may be widened so that heat dissipation may be more effectively performed.

The non-protrusions 3333 are portions which are formed on the one side surface and the other side surface of the second heat dissipating member 333 at a relatively lower height than the protrusions 3331 at peripheries of the protrusions 3331. The non-protrusions 3333 form a space that can be cooled by air between the first electronic control unit 31a, the second electronic control unit 31b, and the second heat dissipating member 333.

The screw holes 3335 are portions which are in communication with the screw hole 319a of the first electronic control unit 31a and the screw hole of the second electronic control unit 31b when the first electronic control unit 31a and the second electronic control unit 31b are disposed. The screw holes 3335 allow the first electronic control unit 31a and the second electronic control unit 31b to be coupled to the heat dissipating member 33 through screws (not shown).

Meanwhile, the first heat dissipating member 331 and the second heat dissipating member 333 may be integrally formed, and may be made of a material of an aluminum alloy of ADC12 or the like, which is advantageous in terms of mechanical properties and thermal conductivity.

Figure 8:
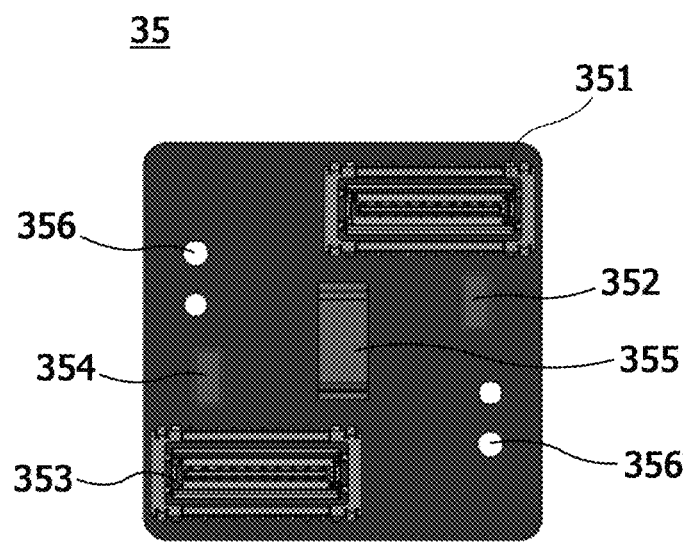
FIG. 8 is a plan view of a connection board of the electric drive control device according to the embodiment of the present invention.

The connection board 35 is a portion which is disposed on the end opposite to the drive shaft 11 of the electric motor among the ends of both sides of the motor housing 1 and connects the first electronic control unit 31a and the second electronic control unit 31b to the electric motor. Referring to FIG. 8, the connection board 35 may be made as one circuit board and the circuit board may be a PCB.

Further, the connection board 35 may be disposed so that one surface thereof is in contact with an end surface of one side of the motor housing 1 in a form in which it is perpendicular to the first electronic control unit 31a and the second electronic control unit 31b, and may include a first connection terminal 351, a first resistor 352, a second connection terminal 353, a second resistor 354, a motor position sensor 355, and screw holes 356.

Each of the first connection terminal 351 and the second connection terminal 353 is a portion connected to any one of the first electronic control unit 31a and the second electronic control unit 31b. Each of the first connection terminal 351 and the second connection terminal 353 may be formed as a slot coupled to one of the connecting pin unit 313a of the first electronic control unit 31a and the connecting pin unit of the second electronic control unit 31b. In this case, the first connection terminal 351 and the second connection terminal 353 may each have a unique identification (ID) assigned separately in hardware.

When a unique ID is assigned to each of the first connection terminal 351 and the second connection terminal 353, the first electronic control unit 31a and the second electronic control unit 31b implemented as the same PCB may not be identified in software installed in the first electronic control unit 31a or the second electronic control unit 31b but may be identified in hardware by determining which one of the first connection terminal 351 and the second connection terminal 353 they are connected to.

For example, even when the first electronic control unit 31a and the second electronic control unit 31b are implemented as the same PCB and thus the first electronic control unit 31a and the second electronic control unit 31b cannot be distinguished from each other in appearance, the first electronic control unit 31a may be coupled to the first connection terminal 351, and the second electronic control unit 31b may be coupled to the second connection terminal 353. In this way, the first electronic control unit 31a and the second electronic control unit 31b may be identified on the connection board 35 in hardware so that it is not necessary to separately identify and manage the first electronic control unit 31a and the second electronic control unit 31b in the production process and it is possible to prevent an assembly failure due to mixing.

The first resistor 352 and the second resistor 354 are used to identify the first connection terminal 351 and the second connection terminal 353 in appearance, and any one of the first resistor 352 and the second resistor 354 may be a pull-up resistor and the other may be a pull-down resistor. Accordingly, the first connection terminal 351 and the second connection terminal 353 may be identified by appearance.

The motor position sensor 355 senses a position of a rotor of the electric motor disposed in the motor housing 1 and transmits information about the position to the first electronic control unit 31a and the second electronic control unit 31b.

The screw holes 356 are holes into which screws for fixing the connection board 35 to an end surface of the motor housing 1 are inserted. The screw holes 356 may be omitted or deformed according to a fastening manner between the connection board 35 and the motor housing 1.

The cover 37 may be a portion for protecting the electric drive control device 3 from external foreign matter or the like, and may be formed in the shape of a cylinder with one open side as shown in FIGS. 1 and 2. Through-holes through which the connector unit 315a of the first electronic control unit 31a and the connector unit of the second electronic control unit 31b can pass and ventilation holes for air inflow and outflow may be formed on the other side which is not open, and the cover 37 may include a dust filter D which covers the ventilation holes or the like.

According to the present invention, it is possible to provide the following effects through the above-described configurations.

According to the present invention, it is possible to provide an electric drive control device in which efficiency of arrangement in a package is improved and the size of the package is reduced by forming an electronic control unit integrally with an electric motor.

According to the present invention, it is possible to provide an electric drive control device in which heat dissipation of an electronic control unit disposed along a drive shaft of an electric motor is effectively performed through a heat dissipating member disposed along the drive shaft.

According to the present invention, it is possible to provide an electric drive control device in which a unique ID is assigned to a connection terminal of a connection board in hardware when two electronic control units are mounted therein so that efficiency of production and management is ensured.

While the present invention has been described with reference to exemplary embodiments thereof, the spirit of the present invention is not limited to the embodiments presented in this specification. Those skilled in the art who understand the spirit of the present invention may easily suggest other embodiments by adding, changing, or deleting elements within the scope of the same concept, and the other embodiments are also within the spirit of the present invention.

What is claimed is:

1. An electric drive control device for controlling an electric motor configured to generate a drive force, the electric drive control device comprising:
   a first electronic control unit disposed opposite to a drive shaft of the electric motor with respect to a motor housing in which the electric motor is accommodated, the first electronic control unit configured to control the electric motor;
   a second electronic control unit disposed opposite to the first electronic control unit with respect to a plate-shaped heat dissipating member, the second electronic control unit configured to control the electric motor; and
   a heat dissipating member disposed opposite to the drive shaft of the electric motor with respect to the motor housing and configured to dissipate heat generated from the first and/or second electronic control units, the heat dissipating member comprising:
      an annular heat dissipating member contacting one side of the motor housing, which is opposite to an other side of the motor housing, at which the drive shaft of the electric motor is positioned, and
      the plate-shaped heat dissipating member disposed between the first electronic control unit and the second electronic control unit, wherein one side of the plate-shaped heat dissipating member is connected to the annular heat dissipating member.

2. The electric drive control device of claim 1, wherein the annular heat dissipating member is coupled to the one side of the motor housing, which is opposite to the other side of the motor housing, at which, the drive shaft of the electric motor is positioned.

3. The electric drive control device of claim 1, wherein:
   the first electronic control unit and the second electronic control unit each include a power circuit unit associated with electric power supplied to the electric motor; and
   protrude from one side surface and an other side surface of the plate-shaped heat dissipating member contacting the first electronic unit and the second electronic unit, respectively, to contact the power circuit units of the first electronic control unit and the second electronic control unit.

4. The electric drive control device of claim 3, wherein the protrusions have a shape in which at least one portions thereof do not overlap each other when viewed in a vertical direction.

5. The electric drive control device of claim 1, wherein each of the first electronic control unit and the second electronic control unit is implemented on one circuit board.

6. The electric drive control device of claim 5, further comprising a connection board disposed at the one side of the motor housing, which is opposite to the other side of the motor housing, at which the drive shaft of the electric motor is positioned, the connection board configured to connect the first electronic control unit and the second electronic control unit to the electric motor.

7. The electric drive control device of claim 6, wherein:
   the connection board includes a first connection terminal and a second connection terminal connected to any one of the first electronic control unit and the second electronic control unit; and
   the first connection terminal and the second connection terminal each have a unique identification (ID) assigned separately in hardware.

8. The electric drive control device of claim 7, wherein the first electronic control unit and the second electronic control unit are identified by the unique IDs of the first connection terminal and the second connection terminal, respectively.

9. The electric drive control device of claim 7, wherein the connection board includes a motor position sensor.

* * * * *